United States Patent [19]

Kim

[11] Patent Number: 5,634,151
[45] Date of Patent: May 27, 1997

[54] AUTOFOCUSING OPERATION DISPLAY APPARATUS AND METHOD

[75] Inventor: Seong-Gon Kim, Kyeongsangnam-do, Rep. of Korea

[73] Assignee: Samsung Aerospace Industries, Ltd., Kyeongsangnam-do, Rep. of Korea

[21] Appl. No.: 568,822

[22] Filed: Dec. 7, 1995

[30] Foreign Application Priority Data

Dec. 8, 1994 [KR] Rep. of Korea ............ 94-33297

[51] Int. Cl.⁶ ............................................. G03B 13/36
[52] U.S. Cl. ............................ 396/106; 396/147; 396/291
[58] Field of Search ........................................ 354/403, 409; 348/348, 346, 333; 250/201.4, 201.6; 356/3.01; 396/106, 147, 291

[56] References Cited

U.S. PATENT DOCUMENTS 5,187,516   2/1993   Suzuki ............................ 354/403

*Primary Examiner*—W. B. Perkey
*Attorney, Agent, or Firm*—Finnegan, Henderson, Farabow, Garrett & Dunner, L.L.P.

[57] ABSTRACT

An autofocusing apparatus including a device for irradiating a light ray toward an object; a device for sensing a light beam corresponding to the image of the object and the light ray reflected off of the object; a device for indicating to the user of the apparatus that the light ray has hit the object based on the result of the sensing by the sensing device. In another embodiment, the autofocusing apparatus includes a device for indicating to the user which portion of the object has been hit by the light ray.

12 Claims, 5 Drawing Sheets

AUTOFOCUSING OPERATION DISPLAY APPARATUS AND METHOD

BACKGROUND OF THE INVENTION

1. Field of the Invention

The present invention relates to autofocusing apparatus; and more particularly, to an autofocusing operation display apparatus and method.

2. Description of Related Art

Generally, an autofocusing apparatus automatically measures the distance between the camera and an object, and causes the photographing lens to move to a proper focal point. Autofocusing became popular long after the introduction of auto exposure apparatus.

Autofocusing may be classified as either a passive method or an active method. In the passive method, light rays radiated from an object are passively received under natural illumination, so that focusing can be carried out by utilizing the contrast or the phase difference. In the active method, infrared rays or ultrasonic waves are projected to an object, and when the infrared rays or the ultrasonic waves are reflected back from the object to the light receiving part, the time delay or the angle with respect to the object is detected, thereby carrying out focusing. Most cameras currently use the active method.

When a user photographs an object with a camera, upon activation of a photographing switch, i.e. a release switch, infrared rays for autofocusing are irradiated toward the object. However, the user cannot determine whether the irradiated infrared rays have hit the object.

In other words, when the user adjusts the direction of the camera toward the object, the user can look at a zone mark displayed on a finder. Then the user recognizes the zone mark as the autofocusing infrared rays, and the user adjusts the camera to the zone mark for an image pickup operation. However, the user cannot determine whether the autofocusing infrared rays have hit the object with precision.

SUMMARY OF THE INVENTION

Accordingly, the present invention is directed to an autofocusing infrared ray motion display apparatus and method for an autofocusing camera where the user can determine whether infrared rays irradiated toward an object have hit the object with precision, thereby assuring the user and improving picture quality.

To achieve these and other advantages and in accordance with the purpose of the invention, as embodied and broadly described, the invention provides an autofocusing apparatus including means for irradiating a light ray toward an object; means for sensing the light ray reflected off of the object; means for indicating to a user of the apparatus that the light ray has hit the object based on the result of the sensing by the sensing means.

In another aspect of the present invention, an autofocusing apparatus includes means for irradiating a light ray toward an object; means for sensing a light beam corresponding to an image of the object and the light ray reflected off of the object; means, coupled to the sensing means, for determining which portion of the object has been hit by the light ray irradiated from the irradiating means in response to the light beam and the light ray sensed by the sensing means; and means for indicating to a user of the apparatus which portion of the object has been hit by the light ray irradiated from the irradiating means.

In yet another aspect of the present invention, a method for controlling an autofocusing apparatus includes the steps of irradiating a light ray toward an object; sensing the light ray reflected off of the object; indicating to a user of the apparatus that the irradiated light ray has hit the object based on the result of the sensing.

In yet another aspect of the invention, a method for controlling an autofocusing apparatus includes the steps of irradiating a light ray toward an object; sensing a light beam corresponding to an image of the object and the irradiated light ray reflected off of the object; determining which portion of the object has been hit by the irradiated light ray in response to the light beam and the sensed light ray; and indicating to a user of the apparatus which portion of the object has been hit by the irradiated light ray.

Additional features and advantages of the invention will be set forth in the description which follows, and in part will be apparent from the description, or may be learned by practice of the invention. The objectives and other advantages of the invention will be realized and attained by the apparatus particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are incorporated in and constitute a part of this specification, illustrate embodiments of the invention and, together with the description, serve to explain the objects, advantages, and principles of the invention. In the drawings.

DETAILED DESCRIPTION OF THE PREFERRED EMBODIMENT

Figure 1:
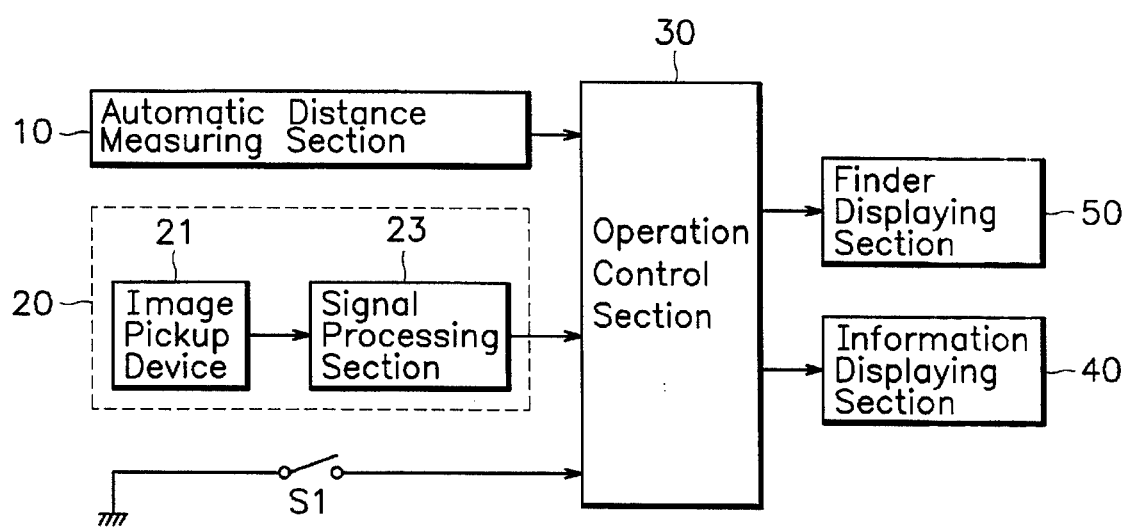
FIG. 1 is a block diagram of the autofocusing infrared ray display apparatus according to the present invention.

As shown in FIG. 1, an apparatus for displaying a autofocusing infrared ray operation, according to an embodiment of the present invention, includes a release switch S1 for changing the operational state in accordance with the operating mode selection by the user to generate electrical signals; automatic distance measuring section 10 for projecting infrared rays, upon activating the release switch S1, for measuring the distance from the camera to an object, and for receiving the infrared rays reflected from the object; picture processing section 20 for converting light received from the object and the reflected infrared rays into electrical signals; operation control section 30 for outputting driving signals for measuring the distance from the camera to an object, upon activating the release switch S1, then determining the automatic distance measuring section 10, in accordance with the signals from the picture processing section 20, have hit the object with precision; information displaying section 40 in accordance with the information signals of the operation control section 30, for displaying which portion of the object is hit by the infrared rays; and a finder displaying section 50, connected to an output terminal of the operation control section 30, for indicating on the finder which portion of the object is hit by the infrared rays in accordance with the incoming information signals.

Figure 2:
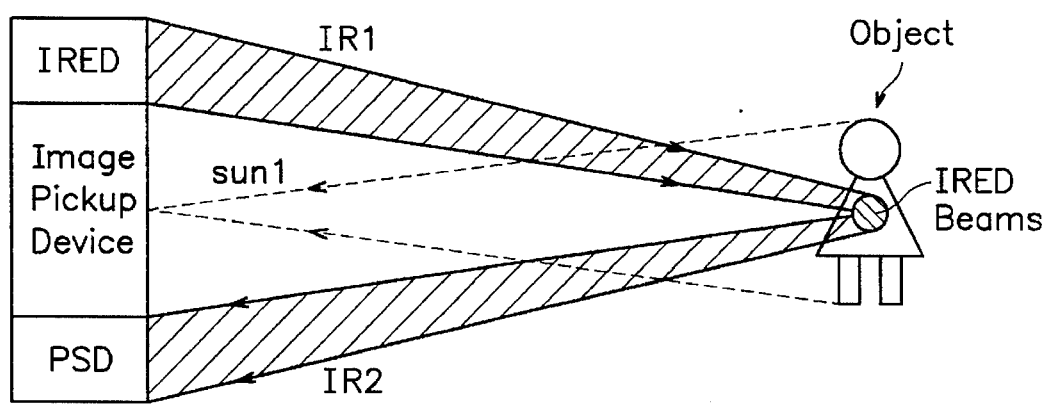
FIG. 2 illustrates the operation of the autofocusing infrared rays of the apparatus of FIG. 1 according to the first embodiment of the present invention.

The automatic distance measuring section 10, as embodied herein, preferably includes an infrared emitting diode (IRED) for projecting infrared arrays and a position sensitive device (PSD) for receiving the infrared rays reflected from the object, as shown in FIG. 2. The picture processing section 20, as embodied herein, preferably includes an image pickup device 21 for receiving the incoming light from the object corresponding to the image thereof and the infrared ray which irradiated from the IRED and reflected off of the object, and converting them into respective electrical signals; and a signal processing section 23 for processing the respective electrical signals from the image pickup device 21 and outputting electrical signals corresponding to the image of an actual object. The operation of the picture processing section 20 is the same as that of a commercially available picture processing system. The information displaying section 40, as embodied herein, preferably includes a liquid crystal display.

The finder displaying section 50 includes display devices (for example, light emitting diodes (LEDs)) 51, 53, and 55 (FIG. 5A), for displaying the portion of the object hit by the infrared ray irradiated from the IRED: for example, for displaying on a finder which portion of the film is occupied by the image of the object when the object is aimed. The finder displaying section 50 may include display devices installed at the left or right or both sides of the finder, for indicating the operational states of the infrared ray i.e., whether the infrared ray has hit the object. However, the embodiment of the finder displaying section 50 is not necessarily limited to the above embodiment.

The operation of the autofocusing infrared ray operation display apparatus according to the present invention will now be described.

Figure 6:
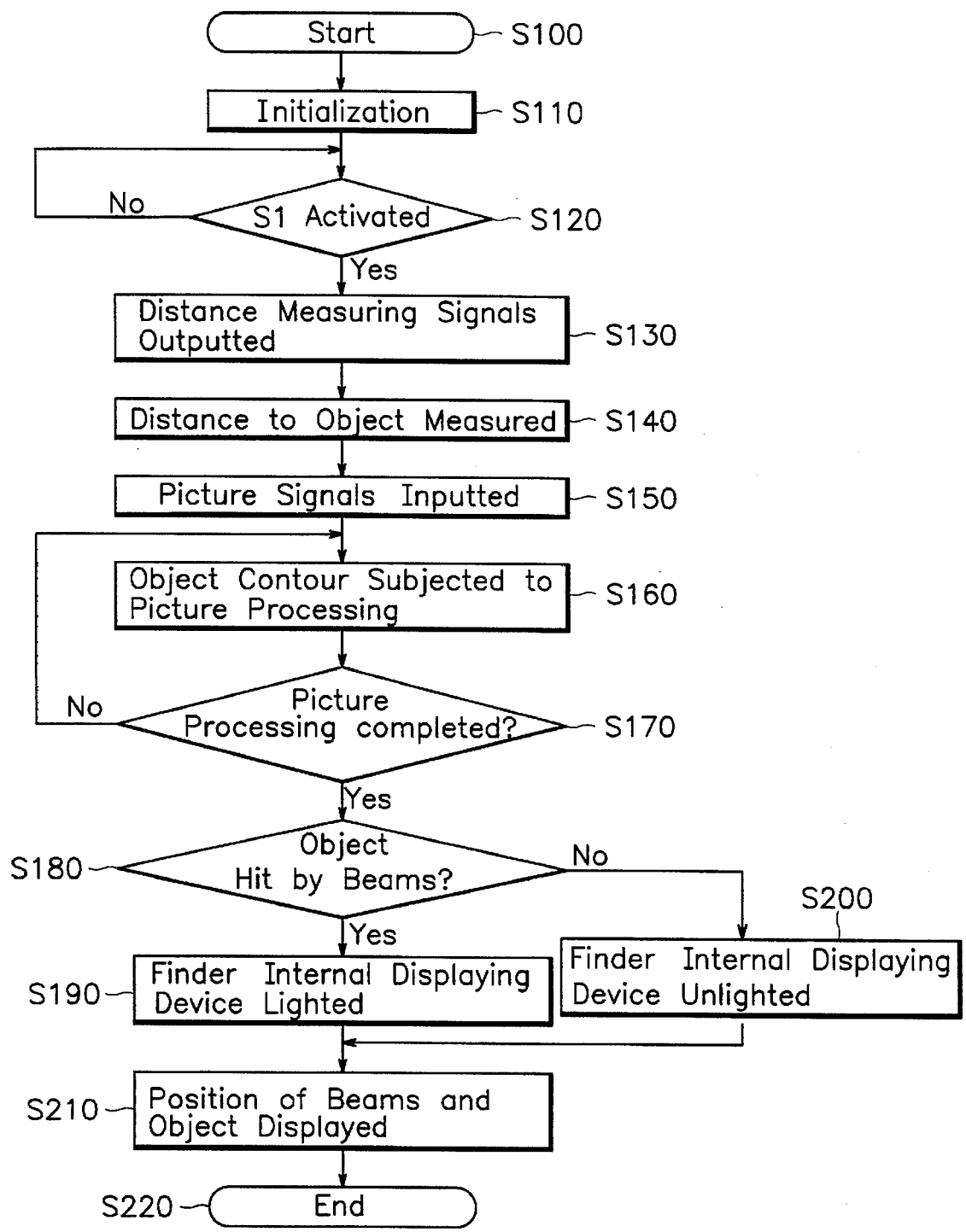
FIG. 6 is a flow chart showing the steps in displaying the autofocusing infrared ray operation according to the present invention.

Referring to FIGS. 1 and 6, when power is supplied to the camera, operation control section 30 initializes all the parameters used for control routines (S110). Operation control section 30 determines user's image pickup operation. If the user activates the release switch S1 to photograph a desired object, then the relevant electrical signals are outputted to operation control section 30. Operation control section 30 detects the presence or absence of the output signals related to the activation of the release switch S1 and determines whether the user has selected the photographing operation (S120). When the release switch S1 is activated, the operation control section 30 outputs driving signals to the automatic distance measuring section 10 for measuring the distance from the camera to the object.

As shown in FIG. 2, the automatic distance measuring section 10 initiates the operation of the infrared ray light emitting diode IRED in accordance with the driving signals of the operation control section 30, so as to project infrared rays for measuring the distance from the camera to the object. The projected infrared rays are reflected from the object and received by the position sensitive device PSD in the automatic distance measuring section 10. The PSD preferably includes two PIN photo diodes, and outputs electrical signals corresponding to the reflected infrared rays to operation control section 30 (S130).

The operation control section 30 measures the distance from the camera to the object in accordance with the signals from the automatic distance measuring section 10 (S140). The algorithm for measuring the distance, as embodied herein, adopts a triangular measuring method. This principle measures the distance from the camera to the object by determining the angle of the camera and the automatic distance measuring section, located in the front of the camera, relative to the object.

Then, as shown in FIG. 2, both the light beam corresponding to the image of the object and the infrared ray which is irradiated from the IRED and reflected off of the object are received by the image pickup device 21 of the picture processing section 20 (S150). The image pickup device 21 converts the above light beam and the reflected infrared ray into respective electrical signals and outputs the electrical signals to the signal processing section 23 of the picture processing section 20.

The signal processing section 23 converts these outputting electrical signals into picture signals corresponding to a picture image of an actual object (S160). The electrical signals corresponding to such a picture image of the actual object are then outputted to the operation control section 30.

The operation control section 30 carries out a procedure for reproducing the picture image of the actual object in accordance with the picture signals from the picture processing section 20 (S170). When such processing of the picture signals is completed, the reproduced picture image of the actual object is used to determine whether the object has been hit by the infrared ray irradiated from the IRED of the automatic distance measuring section 10 (S180).

As described above, both the light beam corresponding to the image of the object and the infrared rays irradiated from the automatic distance measuring section 10 and reflected off of the object are input into the image pickup device 21, and picture processing is carried out to reproduce the picture image of the object. If the object has been is hit by the infrared rays, the infrared ray reflected off of the object appears on the picture of the object. The operation control section 30 accordingly determines whether the object has been hit by the infrared ray irradiated from the automatic distance measuring section 10 in accordance with the reproduced picture image of the object.

Figure 5A:
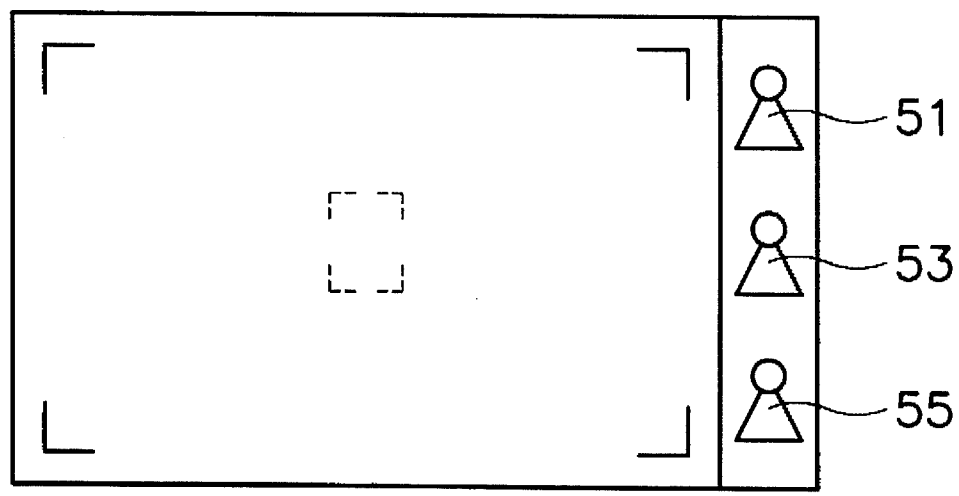
FIGS. 5A–5B illustrate the operational states of the autofocusing infrared rays for the finder displaying section of FIG. 1 according to the first embodiment of the present invention.

Referring to FIG. 5A, if the object has been hit by the infrared ray, the finder displaying section 50 is activated to indicate which portion of the object has been hit by the infrared ray. When the infrared ray has hit the right portion of the object, the displaying device 51 in the finder displaying section 50, as embodied herein, is caused to flash. Similarly, when the infrared ray has hit the center of the object, the displaying device 53 is caused to flash. Similarly, when the infrared ray has hit the left portion of the object, the displaying device 55 is caused to flash. Thus, which portion of the object has been hit by the infrared ray is determined, and the result of the determination is indicated to the user on the finder displaying section 50, utilizing the displaying devices, 51, 53 and 55 (S190).

Figure 5B:
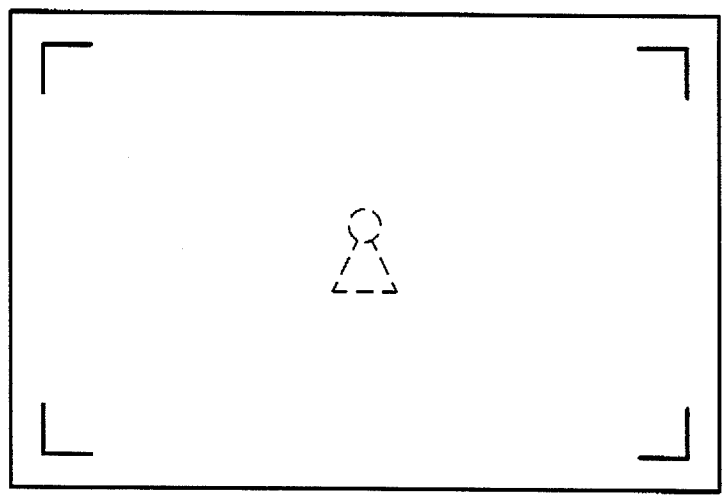

Referring to FIG. 5B, according to another embodiment of the present invention, flashing light beams from the above displaying devices 51, 53, and 55 of the finder displaying section 50 are caused to directly reflect onto the inner lens of the finder, to display on the inner lens of the finder information as to which portion of the object has been hit by the infrared ray. If the reproduced object has not been hit by the infrared ray, the operation control section 30 deactivates the finder displaying section 50, thereby informing the user that the object has not been hit (S200). As stated above, the user is informed which portion of the object has been hit by the infrared ray of the automatic distance measuring section 10 through the finder displaying section 50.

Figure 3A:
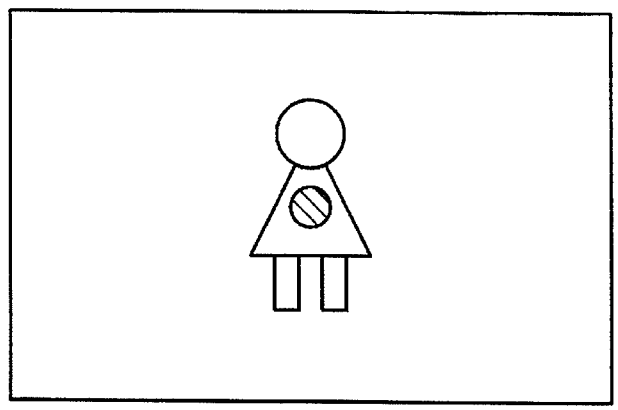
FIGS. 3A–3C illustrate the operational states of the autofocusing infrared rays for the information displaying section of the apparatus of FIG. 1 according to the first embodiment of the present invention.
Figure 3B:
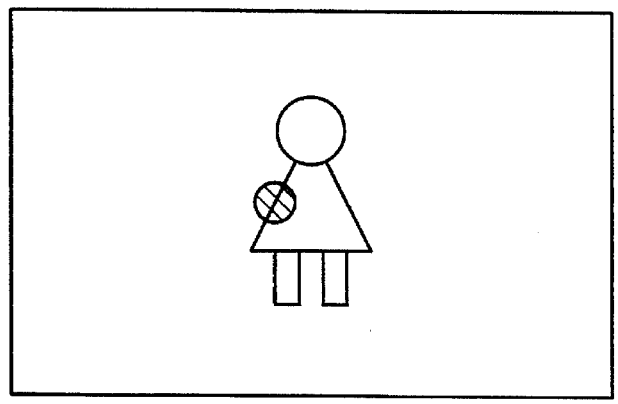
Figure 3C:
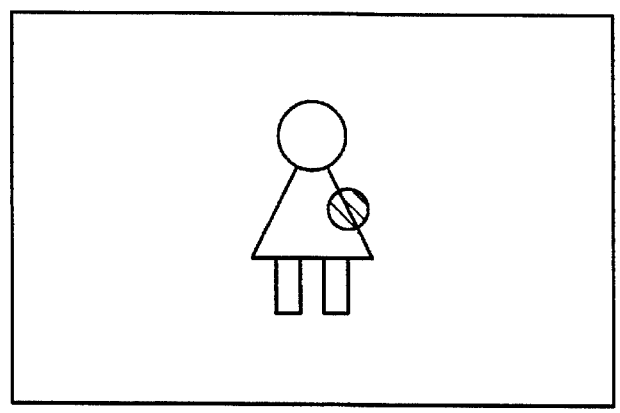

According to yet another embodiment of the present invention, to inform the user about the operational state of the infrared ray more accurately, the operation control section 30, as embodied herein, may activate the information displaying section 40. The operation control section 30 determines which portion of the object has been hit by the infrared ray according to the reproduced picture image. Referring to FIGS. 3A, 3B, and 3C, the operation control section 30 outputs relevant information to the information displaying section 40, thereby informing the user.

Further, the image of the object may appear on the information display section 40. If the center of the object has been hit by the infrared ray, the operation state shown in FIG. 3A is displayed. If the left portion of the object has been hit by the infrared rays the operation state shown in FIG. 3B is displayed. If the right portion of the object has been hit by the infrared ray, the operation state shown in FIG. 3C is displayed (S210). As previously stated, if the object has not been hit at all by the infrared ray, the operation control section 30 does not activate the information displaying section 40, and displays the operational state indicating that the object has not been hit.

Figure 4A:
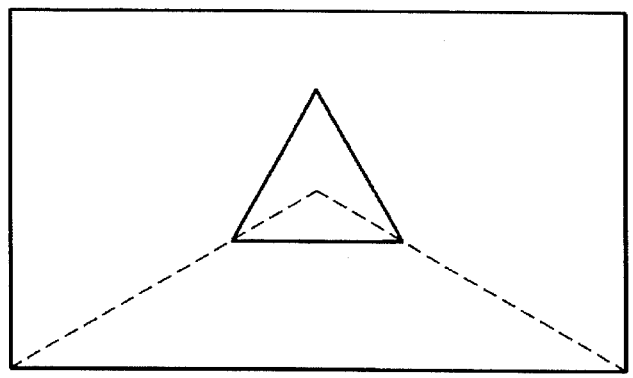
FIGS. 4A–4C illustrate the operational states of the autofocusing infrared rays for the information displaying section of FIG. 1 according to the second embodiment of the present invention.
Figure 4B:
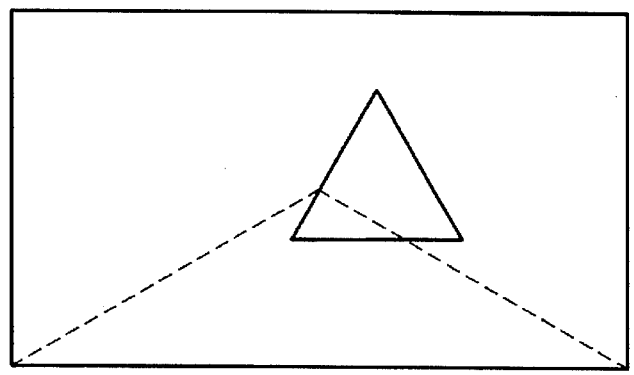
Figure 4C:
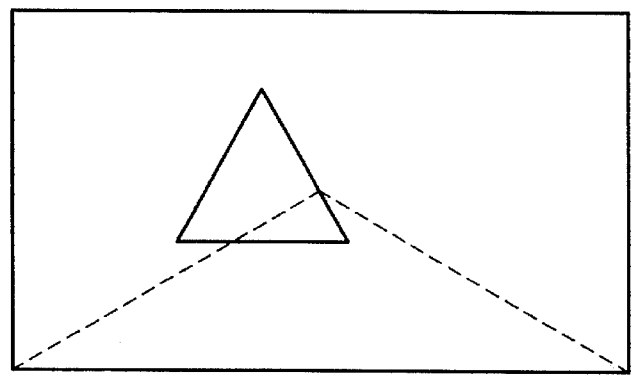

Referring to FIGS. 4A–4C, according to yet another embodiment of the present invention, schematic expressions are represented, illustrating the exact portion of the object which has been hit by the infrared ray. After the operation control section 30 displays which portion of the object has been hit by the infrared ray irradiated from the automatic distance measuring section 10 through the information displaying section 40, the above routine is terminated (S220).

As described above, the portion of the object hit by the infrared ray is displayed through the finder displaying section 50, in one embodiment of the present invention, and through the information displaying section 40, in other embodiments. In the above embodiments, the user is informed as to which portion (namely, the center, left, or right portion) of the object has been hit by the infrared ray. Further, the user can be informed as to whether the portion of the object which has been hit by the infrared ray is the upper or lower or edge thereof. Thus, more precise information concerning the portion of the object which has been hit can be provided.

As described above, according to the present invention, since the information as to which portion of the object has been hit by the infrared ray is displayed to the user, the user can easily determine whether focusing is precisely adjusted, thus assuring the user of a higher photographing accuracy.

What is claimed is:

1. An autofocusing apparatus, comprising:
   means for irradiating an infrared ray toward an object;
   means for sensing a light beam corresponding to an image of said object and said infrared ray reflected off of said object;
   means, coupled to said sensing means, for determining which portion of said object has been hit by said infrared ray in response to said light beam and said infrared ray; and
   means for indicating to a user which portion of said object has been hit by said infrared ray, wherein the indicating means includes
      a view finder through which the user can view the object, and
      displaying means including a plurality of display icons, each display icon corresponding to a different portion of the object.

2. The autofocusing apparatus of claim 1, wherein said determining means includes a processor controller for reproducing said image of said object based on said light beam and for determining which portion of said object has been hit by said infrared ray based on a position of said infrared ray on said reproduced image.

3. The autofocusing apparatus of claim 1, wherein said each display icon includes a light emitting diode.

4. The autofocusing apparatus of claim 1, wherein said each display icon corresponds to a respective one of the center, left, and right portions of said object.

5. The apparatus of claim 1 wherein the display icon flashes to indicate the corresponding portion of the object hit by the infrared ray.

6. The apparatus of claim 1 wherein the display icons are displayed directly onto the view finder.

7. The apparatus of claim 2 wherein the indicating means further includes
   a information display section displaying the reproduced picture image and indication of the portion of the object hit by the infrared ray.

8. A method for controlling an autofocusing apparatus, comprising the steps of:
   irradiating an infrared ray toward an object;
   sensing a light beam corresponding to an image of said object and said irradiated infrared ray reflected off of said object;
   determining which portion of said object has been hit by said irradiated light ray in response to said sensed light beam and said sensed infrared ray; and
   indicating to a user which portion of said object has been hit by said irradiated infrared ray, including the substeps of
      viewing the object through a view finder, and
      displaying a display icon corresponding to the portion of the object hit by the infrared ray.

9. The method of claim 8, wherein said determining step includes reproducing said image of said object based on said sensed light beam and determining which portion of said object has been hit by said irradiated infrared ray based on a position of said sensed infrared ray on said reproduced image.

10. The method of claim 8, wherein said indicating step includes flashing the display icon to indicate which portion of said object has been hit by the irradiated infrared ray.

11. The method of claim 9, wherein said displaying substep includes the step of displaying said reproduced image of said object and indicating on said displayed reproduced image which portion of said object has been hit by said infrared ray.

12. The method of claim 8, wherein said displaying substep includes indicating to the user directly on the view finder the display icon corresponding to the portion of said object hit by the infrared ray.

* * * * *